United States Patent [19]

Christensen

[11] 4,309,631
[45] Jan. 5, 1982

[54] KITCHEN MIXER HAVING MEANS TO INSTANTANEOUSLY INCREASE SPEED WHEN DESIRED

[75] Inventor: Arthur C. Christensen, Thomaston, Conn.

[73] Assignee: Scovill Inc., Waterbury, Conn.

[21] Appl. No.: 199,661

[22] Filed: Oct. 22, 1980

[51] Int. Cl.³ .................................................. H02P 7/08
[52] U.S. Cl. ................................... 310/50; 200/80 R; 318/354
[58] Field of Search ............... 310/50; 200/80 R; 366/342, 343, 344; 318/305, 325, 354; D7/153

[56] References Cited

U.S. PATENT DOCUMENTS

| 2,348,895 | 5/1944 | Gaudio | 310/80 |
| 2,500,190 | 3/1950 | Lee | 200/80 R |
| 2,733,396 | 1/1956 | Luther | 200/80 R |
| 3,013,133 | 12/1961 | Seyfried et al. | 200/80 R |
| 3,660,741 | 5/1972 | Walter | 200/80 R |
| 3,924,169 | 12/1975 | Craft et al. | 318/354 |

Primary Examiner—J. D. Miller
Assistant Examiner—Donald L. Rebsch
Attorney, Agent, or Firm—Dallett Hoopes

[57] ABSTRACT

A kitchen mixer having a centrifugal speed control in which a control contact is positioned by a follower engaging a cam linked to a rotatable speed-selector knob. The cam has two levels so that by pressing the cam downward by means of a button on the outside of the mixer housing the follower engages second level and shifts contact to increase the mixer speed.

6 Claims, 5 Drawing Figures

KITCHEN MIXER HAVING MEANS TO INSTANTANEOUSLY INCREASE SPEED WHEN DESIRED

BACKGROUND OF THE INVENTION

1. Field of the Invention

This invention relates to a kitchen mixer having a centrifugal speed control and provides means by which the speed may be instantaneously increased by pressing a button on the mixer housing.

2. Description of the Prior Art

In the prior art, there are showings of centrifugal speed controls for kitchen mixers. An example is U.S. Pat. No. 3,013,133 to Seyfried et al, issued Dec. 12, 1961. Earlier arrangements provided a collar on the motor shaft adapted to be moved by a centrifugal element as the speed increased. The collar in turn engaged a contact blade, moving it, depending on the speed of the motor. The contact blade was engaged by a second contact positioned by the setting of the speed control. The structure described functions by moving the contact blade away from the second contact at speeds in excess of the setting to open the motor circuit and cause the speed to fall back. This making and breaking of the contacts goes on continuously as the mixer runs to maintain set speed.

In the past, there have been means to temporarily increase the speed of a mixer by pressing a button on the housing. Such increase has been necessary upon the encountering of a thickened batter, for instance. Such increase, however, has been achieved electrically rather than mechanically and has involved the use of a switch which has, for instance, shorted out a diode in the motor circuit to give the motor greater effective voltage. An example of such an arrangement is shown in U.S. Pat. No. 3,924,169, issued Dec. 2, 1975 to Craft et al. Also special coils have been used in the motor field.

SUMMARY OF THE INVENTION

Under the present invention, momentary speed increase is achieved by a momentary shifting of the position of the second contact to a position at which a greater speed is obtained due to greater engagement time between the contacts. Specifically, the speed control cam which adjusts the position of the second contact, is a disc cam which has a second disc cam level, all positions on the second level being outward from the first level so that when the cam is shifted axially, the cam follower shifts this second contact toward a higher speed position. Desireably, the cam shifter is spring biased so that when the control button for the cam position is released, the lower speed setting is back in operation.

It will be understood that the slight cost of the added cam contour and the means for shifting the cam axially are markedly less expensive than the special coils or switch and diode as required in electrical versions mentioned above.

BRIEF DESCRIPTION OF THE DRAWINGS

Other objects and features of the invention will be apparent from a study of the following specification and drawings, all of which disclose a non-limiting embodiment of the invention.

In the drawings.

DESCRIPTION OF THE PREFERRED EMBODIMENT

Figures 1, 2, 5:
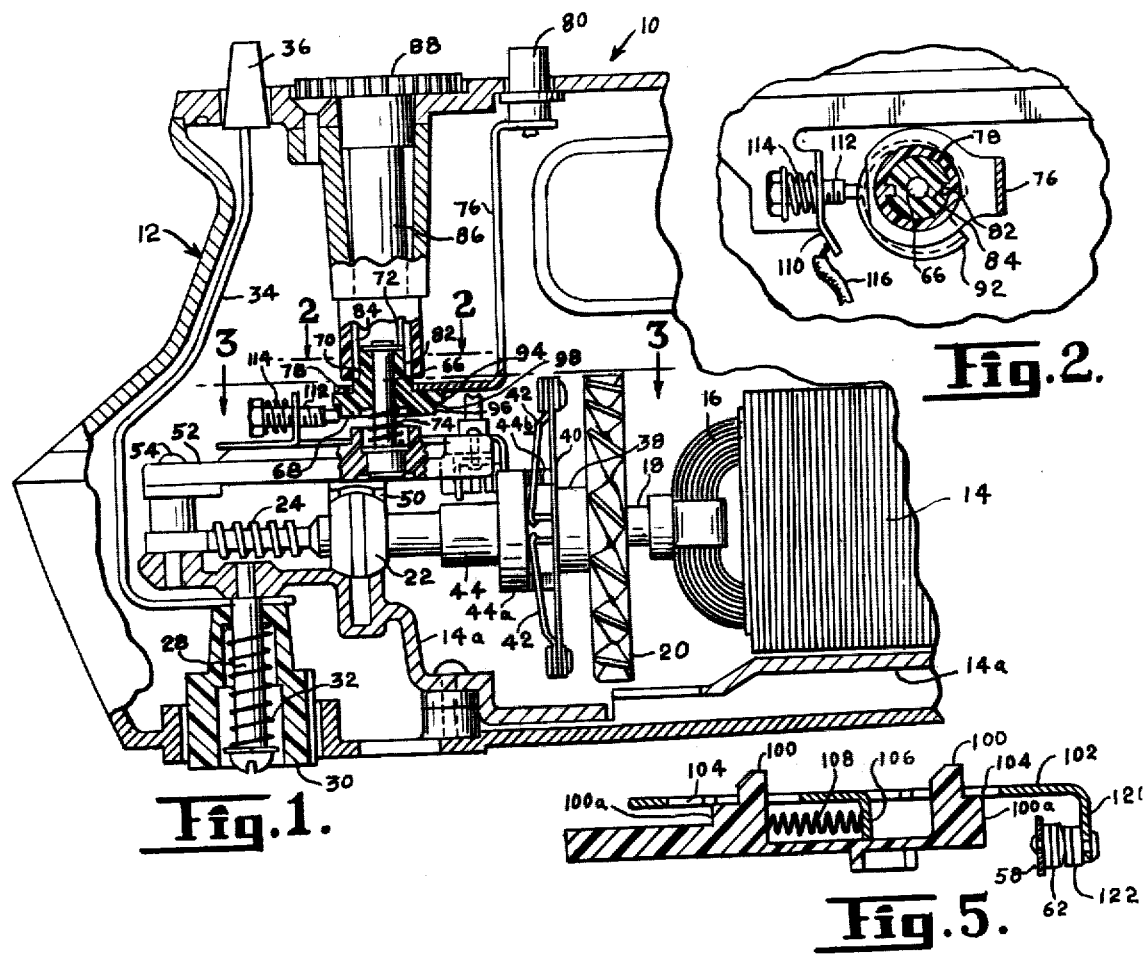
FIG. 1 is a fragmentary sectional view with only a portion of the housing shown intact of a kitchen mixer embodying the invention.
FIG. 2 is an enlarged fragmentary sectional view taken on the line 2—2 of FIG. 1.
FIG. 5 shows an enlarged sectional view taken on the line 5—5 of FIG. 3.

Referring more specifically to the drawings, a kitchen mixer embodying the invention is shown partially in FIG. 1 and generally designated 10. It comprises a housing 12 in which is mounted a motor 14 having a frame 14a and armature 16 with a shaft 18. The shaft mounts a fan 20 and the distal end of the shaft passes through a bearing 22 appropriately mounted on frame 14a in the housing. A worm gear 24 is formed adjacent the end of the shaft and engages worm wheels 26 (FIG. 3) to drive the two mixing beaters (not shown) as is conventional.

Ejector means is provided between the worm wheels and comprises a downward bolt 28, the upper end of which is secured to the motor frame 14a. The ejector head 30 is loosely mounted on bolt 28 and is biased by spring 32 upward, as shown. A metal ejector operator 34 extends up from head 30 and terminates upwardly in a button 36 extending through the housing 12. In operation, as is conventional, when it is desired to eject the beaters, the button 36 is pressed causing the head 40 to engage the beaters by their stem flanges (not shown) to pop them out of their sockets.

The centrifugal speed control is shown mounted on the shaft 18 and comprises a hub 38 which mounts a flexible cross member 40. To the outer ends of the cross member are riveted a pair of inward plates 42 which, as speed increases, tend to flex outward to cause the speed control collar 44 to slide on the shaft 18. As shown, the collar 44 is stepped outward at 44a. It is keyed to rotation with the plates 42 which have openings receiving projections 44b. All of the structure is as disclosed in the aforementioned Seyfried et al patent.

Figures 3, 4:
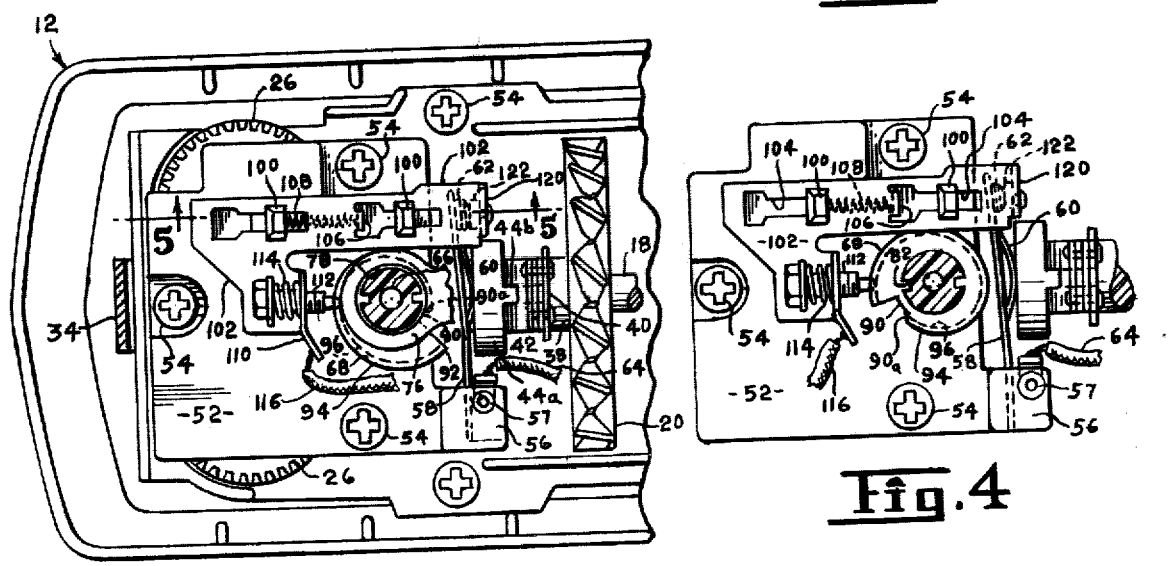
FIG. 3 is a fragmentary sectional view taken on the line 3—3 of FIG. 1.
FIG. 4 shows a portion of the FIG. 3 view with the contact slide and cam in a speed-up position.

The motor frame is formed with a plurality of upstanding bosses 50 to which is bolted a speed control base plate 52 of insulating plastic by bolts 54. As shown in FIG. 3, the base plate 52 has an outward projection 56 to the underside of which is secured by rivet or grommet 57 of a contact blade 58, made of brass or copper. The blade is formed with a hump 60 which is engaged by the step 44a of the collar. The distal end of the blade carries the contact 62. The end of the contact blade 58 which is riveted to the projection 56 is connected to a current lead 64.

As shown in FIG. 1, the base plate 52 mounts an upstanding cam spindle 66 on which is disposed the two-level disc cam 68 having an upstanding hub 70 through which the spindle passes. A "C" ring 72 defines the upper limit of the cam travel on the shaft 66 and the spring 74 biases the cam upwardly. A sheet metal operator 76 has an opening 78 which loosely receives the hub 70 and the operator portion therearound bears on the top of the disc portion of the cam. Operator 76 extends upward to terminate in an operator button 80 at the top of the housing. By pressing downward on the button 80, the cam may be shifted downward on its shaft for reasons to be explained.

Preferably, the hub is formed with a pair of keyways 82 which receive keys 84 in the central opening of the downward spindle 86 of a speed selector knob 88. This rotatably links the knob 88 to the cam 68.

Referring more specifically to the cam, in FIG. 3 it will be seen that the operating surface of this disc-type cam is generally of snail-shell-like contour, the surface distance from the axis increasing from a low or well 90 up a small step 90a and gradually increasing around to a high of 92.

As shown in FIG. 1, it will be seen that the disc cam has two levels, 94 and 96, both similar but the lower one being slightly less in radius at any key radial point. The step between the two levels is slightly inclined as at 98. The base plate 52 is formed with a pair of aligned upstanding ears 100 (FIG. 3) and a second contact slide plate 102, made of metal, is provided having keyhole-shaped apertures 104 through the larger portion of which the ears 50 pass in assembly and in the smaller portion of which the ears generally are disposed in operation. As shown, the ears are formed with integral spacers 100a which keep the slide plate 102 up above the base plate 52. The slide plate 102 is formed with a downturned tab 106 and a spring 108 is held in compression between the tab 106 and the adjacent ear 100 to urge the slide plate rightwardly as shown in FIG. 5.

As shown in FIG. 3, the slide plate 102 has a lateral extension which is formed with an upward flange 110. Flange 110 is apertured and tapped to receive a threaded adjustable cam follower 112 which has a rounded nose, as shown, and is surrounded adjacent its head by a spring 114 in compression adapted to keep the follower from working out of adjustment. Adjacent the flange of the metal slide plate 102, a second current lead 116 is attached, the current leads 64 and 116 being connected in series with the motor 14 and a power supply (not shown).

The forward end of the slide plate 102 is formed with a downturned foot 120 to which is secured the second contact 122 aligned with and facing contact 62 on blade 58.

By virtue of the structure described, the rotary position of the cam 68 and its vertical position, as described, determine the speed of the motor 14. Referring to FIG. 3, it can be imagined that with the nose of the follower 112 riding in the lower level 96 that, as the cam is rotated by knob 88 in a counterclockwise direction, the slide plate will move rightwardly as the distance of the follower nose to the center of the cam diminishes. This rightward movement of the slide plate moves the second contact 122 rightwardly also decreasing the speed at which the contacts separate to break the motor circuit.

Conversely, with the cam in the position shown in FIG. 3, rotation of the cam in the clockwise direction (so that high point 92 approaches the cam follower 112) causes the slide 102 to move leftwardly, also moving contact 122 leftwardly, increasing the speed at which contacts 122 and 62 separate.

It will be understood that when the cam is turned counterclockwise to a position in which well 90 receives the follower 112, contact 122 is rightward out of reach of contact 62 altogether so that the mixer is off.

By virtue of the bi-level nature of cam 68, it will be seen that for any setting of cam 68, speed may be instantaneously increased by pressing down on button 80. This causes, through operator 76, the entire cam 68 to move downward so that the follower slides outward from the position shown in FIG. 4 up incline 98 to second level 94 with a consequent shift leftwardly of the slide plate 102. This, in turn, of course, causes the contact 122 to move leftwardly and to increase the speed at which contacts 62 and 122 separate, increasing the speed of the motor. Subsequent release of the button 80 permits the cam 68, spring biased by spring 74, upwardly again so that follower 112 operates on the first or lower level 96 as shown in FIG. 3.

The preferred embodiment and operation thereof has been described. It should be understood the invention is not so limited but is susceptible of many modications and variations, all within the scope of the appended claim language and equivalents thereof.

I claim:

1. In a kitchen mixer having a motor with a speed control including a drive shaft having a collar mounted for longitudinal movement with respect thereto and centrifugally operated structure on the shaft adjacent the collar and adapted to move the collar away from the structure as the speed of the motor increases, a contact blade with a first contact disposed adjacent the shaft and adapted to be moved by the collar, mounting means disposed adjacent the shaft and having a cam follower to be shifted longitudinally of the shaft and having a second contact aligned with the first contact, disc cam means adjacent the mounting means and adapted to be rotated and shifted longitudinally of its axis, the cam means having a first level with a generally snail-shell-like contour and being outwardly stepped beyond the first level to present a second level having a similar but larger snail-shell-like contour, and electric circuit means connecting the contacts and the motor in series, whereby the rotary position of the cam will control the speed of the motor and a shift of the cam on its axis alters the position of mounting means as the follower rides up on the step to increase the speed over the set speed normally resulting at the given rotary position of the cam.

2. The improvement as described in claim 1 wherein the cam is spring-biased to position the follower on the first level.

3. The improvement as described in claim 2 wherein means are provided on the outside of the mixer housing to shift the cam.

4. In a kitchen mixer having a centrifugal speed control including a pair of contacts, the first contact being moved in accordance with the speed of the mixer shaft and the second contact being movable by a control external of the mixer housing, the improvement wherein (a) a slide frame mounted in the mixer carries the second contact and a cam follower;
   (b) a disc cam is mounted for rotation in the housing and engages said follower, the disc cam depending on its rotary position controlling the position of the second contact, the disc cam having two separate levels of operation, the first being inward from the second; and
   (c) means operable external of the housing to shift the cam on its axis so that the follower engages the second level with consequent shifting of the second contact to a position in which greater speed is required to separate the contacts than in the corresponding rotary position of the first level.

5. The structure as claimed in claim 4 wherein the slide plate is spring-biased in the housing so that the follower is urged toward the center of the cam.

6. The structure as claimed in claim 4 wherein the cam is biased in a position in which the follower engages the first level.

* * * * *